Aug. 21, 1923.
A. GERSTMAYR
VEHICLE WHEEL
Filed Aug. 15, 1919
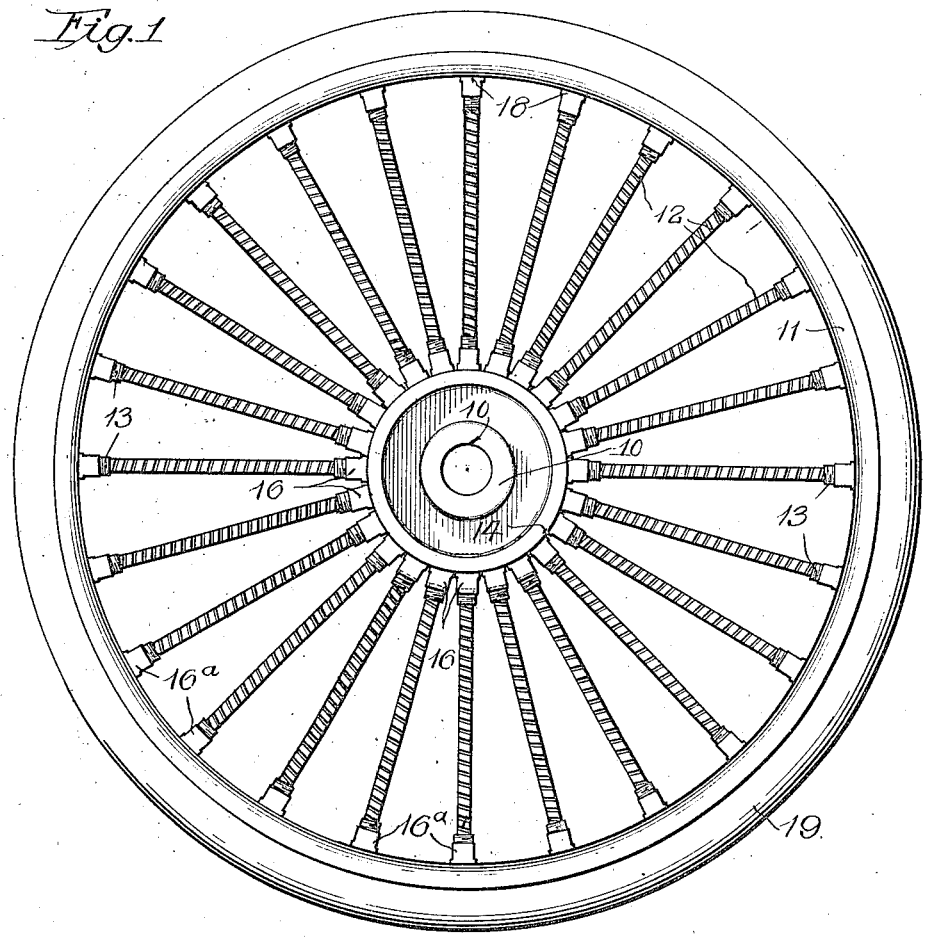
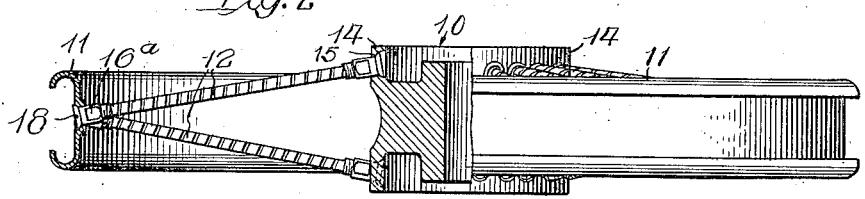
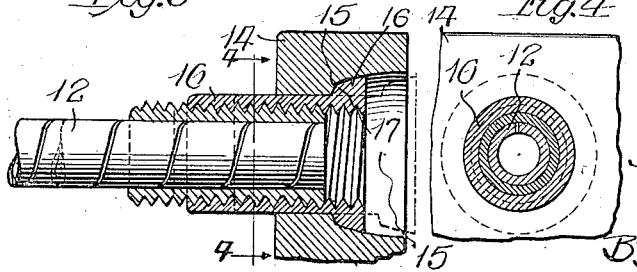
Inventor
Anton Gerstmayr
By: Clarence Loftus
Atty.

Patented Aug. 21, 1923.

1,465,261

UNITED STATES PATENT OFFICE.

ANTON GERSTMAYR, OF CHICAGO, ILLINOIS.

VEHICLE WHEEL.

Application filed August 15, 1919. Serial No. 317,673.

*To all whom it may concern:*

Be it known that I, ANTON GERSTMAYR, a citizen of the United States, residing at Chicago, in the county of Cook and State of Illinois, have invented a new and useful Improvement in a Vehicle Wheel, of which the following is a specification.

My invention relates to a vehicle wheel adapted for use in connection with motors or other vehicles, its main object being to provide a new and improved resilient wheel of this type.

Another object of my invention is to provide a new light, all-metal spoke wheel, which wheel when assembled, is substantially rigid under normal conditions, but at the same time the all-metal spokes thereof possess sufficient resiliency to give slightly under abnormal strains to prevent breakage and disruption or the snapping off of the spokes. It is well known that wire wheels now in general use, particularly for automobiles, that is, wheels having wire spokes, considerable difficulty is encountered in that the wire spokes are frequently snapped off or broken under abnormal strains, usually lateral strains, such as for example, that imposed when the wheels strike an obstruction and in addition they frequently become loose, thus making it necessary to have them repaired. It is generally understood that if one is giving proper attention to the care of his machine, that the wire wheels having solid wire spokes should be gone over carefully about every month for the purpose of replacing broken or distorted spokes and tightening the loosened ones. It is therefore a further object of my invention to provide an improved light metal wheel for automobiles and the like, which wheel, while substantially rigid when properly assembled, possesses sufficient resiliency to compensate for or take care of the abnormal strain imposed upon the wheel in use and thus eliminate the excessive breakage and distortion inherent in the automobile wheels in use, such as the solid wire spoke wheels.

The above and other features of novelty, advantages and capabilities of my invention will become apparent from a detailed description of the accompanying drawings in which I have illustrated one embodiment thereof, but the construction shown is to be understood as illustrative only and not as defining the limits of my invention.

Fig. 1 is a side elevational view of a vehicle wheel embodying one form of my invention.

Fig. 2 is a front elevational view of the same, the upper portion there being in section.

Fig. 3 is an enlarged cross sectional detailed view showing the connection between the spoke and hub, and Fig. 4 is a cross sectional view taken on the line 4—4 of Fig. 3, looking in the direction indicated by the arrows.

Referring to the drawings in detail, the hub 10 on which the load is carried, is connected to the rim 11 by means of a plurality of hollow metal spokes 12; spokes 12 are formed of a strip of metal helically wound over a core, which core after forming is removed, which strip has a greater width than thickness, with its greater dimension lying parallel with the axis of the spoke or coil, so that the formed spoke is substantially cylindrical with the adjacent edges of the strip slightly spaced apart. This spoke thus formed and when properly connected to the hub and rim is substantially rigid for practical purposes in a wheel of this class, but at the same time possesses sufficient resiliency to give slightly, both vertically and laterally under abnormal strains, thus preventing breakage or disruption thereof. The spokes after being so formed are cut in the desired lengths and are provided at each end by any suitable means with screw-threaded sleeves 13.

The hub 10 has on each side integral flanges 14, which flanges are provided with a plurality of openings as best shown in Figures 2 and 3. The openings are provided with a bevel shoulder 15. Fitted loosely in each opening is an interiorly screw threaded collar 16 with its inner end flanged and bevelled at 17 for registering with the bevelled shoulder 15 in the openings in the flange of the hub. The rim 11 is likewise provided with a series of bevelled openings in which are loosely mounted screw threaded collars 18 substantially identical with the collars 16. The collars 18 like the collars 16 are also provided with a bevelled flange adapted to engage the sides of the bevelled openings in the rim. The outer contour of the exposed portion $16^a$ of these collars may be of any desirable form preferably of a shape to be easily gripped by a wrench. In the particular form shown the sides are flattened at diametrically opposite points.

The spokes when connected to the hub and rim are put under sufficient tension by screwing the collars 16 and 18 to the desired point, to permit a slight expansion under ordinary strains and a slight contraction when such strains have past, but when the wheel is subjected to abnormal strains and there is a perceptible upward movement of the rim with respect to the hub, the inner end of the spokes which are at that moment in the lower portion of the wheel are permitted to and will by virtue of the slidable connection with the hub move slightly inwardly into the recess in the hub as best shown in dotted lines in Figures 1 and 3.

The advantage of this can be more clearly understood and appreciated by describing the action and behavior of the wheel under conditions of use. Assuming that the wheels are in use and a load on the axle, the load is floated from the rim by the upper spokes, while the spokes in the lower portion of the wheel are relieved of any compression strain and are only subjected to a slight tension strain. When the wheel strikes an abrupt obstruction in the roadway, the hub in which the axle is mounted has a tendency to proceed in a straight line while the rim is thrown upwardly, at which moment the spokes in the upper portion of the wheel are under abnormal tension strain and are caused to elongate slightly while the spokes in the lower portion of the wheel are relieved of all compression strains and the tension is released by the upward movement of the lower portion of the rim with respect to the hub and the inner ends of the lower spokes moved into the recess in the hub after the initial tension has been released. The instant the abnormal strain is past the spokes then in the upper portion of the wheel serve as shock absorbers and allow the hub to gradually return to its normal position. In other words, the spokes are so designed as to automatically self center the rim with respect to the hub or the hub with respect to the rim after the abnormal strains have passed.

By virtue of the interiorly threaded collars in the rim and hub, which collars are loosely mounted therein, a spoke can be readily and quickly replaced without in any wise disturbing the other spokes or removing the cap from the hub.

The wheel may be used with a pneumatic or solid rubber tire. In the particular embodiment shown it is provided with a solid rubber tire 19. From the foregoing it will be seen that I have produced a wheel and particularly a spoke for vehicle wheels having many novel and advantageous features.

Having thus described my invention what I claim is:

In a substantially rigid vehicle wheel, the combination of a rim, a hub, a plurality of all-metal spokes connecting the rim and hub, said spokes comprising a helically coiled metal strip having a greater width than thickness with its greater dimension lying parallel with the axis of the coil for the purposes set forth.

In witness whereof, I have hereunto subscribed my name to this specification in the presence of two witnesses.

ANTON GERSTMAYR.

Witnesses:
FRITZ C. BITTKE,
HENRY SCHWARZEL.